Dec. 15, 1925.  
J. R. OISHEI ET AL  
FLUID PRESSURE MOTOR 1,565,493

Original Filed May 10, 1923

INVENTORS.  
John R. Oishei  
and Ervin C. Horton,  
by Parker Brockmeier  
ATTORNEYS.

Patented Dec. 15, 1925.

1,565,493

UNITED STATES PATENT OFFICE.

JOHN R. OISHEI, OF BUFFALO, AND ERWIN C. HORTON, OF HAMBURG, NEW YORK, SAID ERWIN C. HORTON ASSIGNOR TO SAID JOHN R. OISHEI, OF BUFFALO, NEW YORK.

FLUID-PRESSURE MOTOR.

Application filed May 10, 1923, Serial No. 638,028. Renewed March 11, 1925.

*To all whom it may concern:*

Be it known that we, JOHN R. OISHEI and ERWIN C. HORTON, citizens of the United States, residing at Buffalo and Hamburg, respectively, in the county of Erie and State of New York, have invented a new and useful Improvement in Fluid-Pressure Motors, of which the following is a specification.

This invention relates to improvements in fluid motors and more particularly to improvements in pistons and piston mountings of such motors.

Heretofore in fluid motors utilizing low pressures, there has been considerable difficulty in providing pistons which will effectively contact with the walls of the fluid pressure chambers so as to prevent leakage of fluid past the piston and yet at the same time permit a free and easy action of the piston so that it may be operated by fluid at relatively low pressures. In an endeavor to overcome this leakage it has been customary to provide elaborate packings for the pistons and to utilize stuffing boxes or stuffing glands, with their attendant packing upon the shaft which carries the piston, but the provision of such means has not heretofore prevented the leakage described or has resulted in undue friction losses. Furthermore, pistons heretofore used have been relatively complicated and difficult to manufacture.

The objects of the present invention are to provide an improved fluid pressure motor which requires no sealing glands or stuffing boxes on the piston shaft; also to provide an improved piston for fluid pressure motors; and also to provide improvements in methods of manufacturing and assembling pistons for fluid pressure motors. Further objects are to provide other improvements in fluid pressure motors and pistons therefor in the other respects set forth and claimed.

Figure 1:
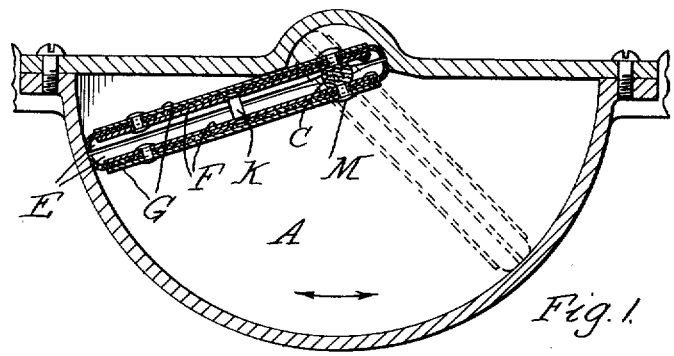
Fig. 1 is a section of a motor embodying the invention.
Figure 2:
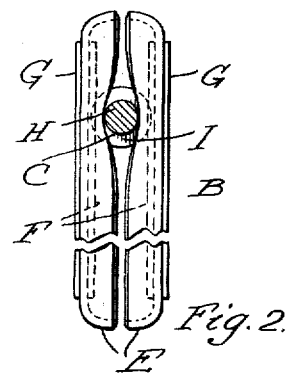
Fig. 2 is a side elevation of the improved piston.

In the drawings there is illustrated a fluid pressure motor having a piston of the oscillating type which is swung in the pressure chamber by pressure. This motor may be operated by any desired fluid, such as air, gas or liquid under pressure. In the use of devices of this type heretofore, in operating with air as the moving medium, there has been a tendency for the air to enter in and around the piston shaft and to cross over the piston shaft from one side of the piston to the other, thereby lowering the efficiency of the device. In the device of the present invention the motor is so constructed that when such air enters along the piston shaft it is utilized to effect operation of the piston and provide a better seal between the piston and the chamber in which it moves and to improve the efficiency of the device.

In the drawings, A designates a fluid chamber and B generally designates a piston therein mounted on a shaft C to swing in the manner above set forth. The casing has a cover plate which is applied on the plane of the axis of the shaft. The piston B extends above and below the shaft C and preferably at opposite sides and is provided with piston leathers and packings E which are substantially cupped and have their side edges extending inwardly toward the shaft. The piston is provided with suitable means which tend to hold the side edges of the piston packing in contact with the inner wall of the fluid chamber, so that preferably the cupped packings contact continuously with the walls of the piston chamber around the perimeter of the piston. As illustrated, the packings may be held in the desired position by inner plates F spaced apart on opposite sides of shaft C and in addition by outer plates G, if desired.

Figure 3:
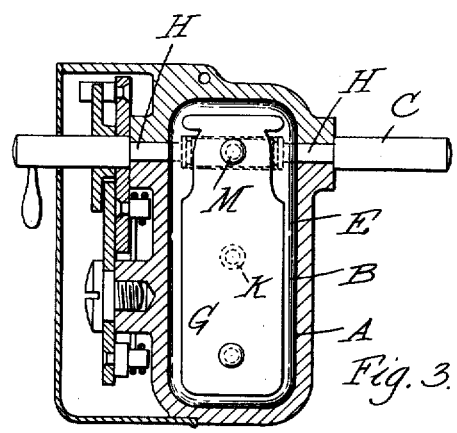
Fig. 3 is a sectional elevation of a motor embodying the invention.
Figure 4:
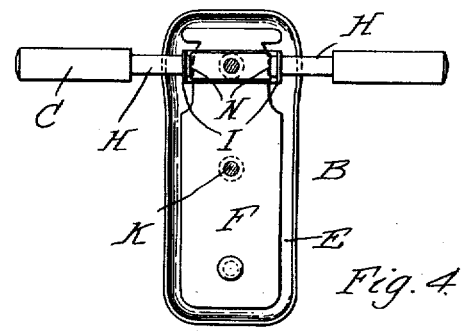
Fig. 4 is an elevation of one of the halves of the piston on the piston shaft.
Figure 9:
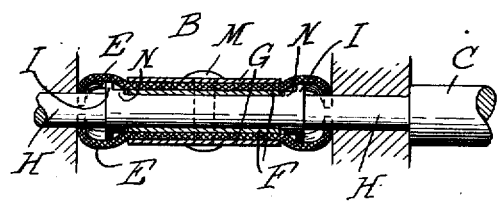
Fig. 9 is a section through the upper part of the piston, on a slightly enlarged scale.

The shaft C is preferably provided with reduced bearing portions H preferably journalled in the walls of the fluid chamber. These reduced bearing portions preferably extend a distance into the piston behind the side edges of the piston packing, as shown in Figs. 3, 4 and 9, and provide for the entrance of sufficient air to effect a sealing pressure on the cup leather around the piston shaft or over the piston shaft into the piston and behind the side edges of the piston packing. As the edges of the piston packing face inwardly toward the shaft, air admitted to the piston behind the piston packing tends to move the edges of the piston packing outwardly. The result is that the air which in the devices used heretofore has leaked past the packing and through the device to the impairment of its efficiency, is utilized in the device of this invention to cause operation of the vane piston and effect a tighter sealing between the piston packing and the walls of the fluid chamber. At the point where the piston packings contact with the reduced portion of the piston shaft in this improved construction, the edges of the piston packing are preferably left free to move on the reduced portion of the piston shaft, thus providing a limited movement of the edges of the piston packing along the piston shaft, which effectively insures that when air has entered behind the piston packings, it will move the edges of the piston packings outwardly sufficiently to cause a close contact with the walls of the fluid chamber and prevent the air from leaking past at that point. Thus, it will be seen that in use of this device under suction, as where a partial vacuum is created first at one face and then at the opposite face of the piston, atmospheric air being admitted to the reverse faces of the piston to relieve the partial vacuum tending to be set up at that face of this piston by swinging of the piston, any air tending to leak past the piston from the pressure to the suction side and the atmospheric air coming in around or along the piston shaft, is utilized to seal the piston and exert its pressure against the piston to swing the piston. In other words, any air which may be free to pass along the shaft into the interior of the casing and which has heretofore caused leakage is utilized for the purpose of applying atmospheric pressure behind the packing to force the packing against the interior of the piston chamber to prevent or materially limit leakage. The provision of the reduced portion on the shaft forms a pair of shoulders I against the piston and as best illustrated in Fig. 9, these shoulders I hold the sealing edges of the piston packing at the shaft in proper position and insure the proper curvature of the edges of the shaft for causing the sealing action above referred to.

Figure 5:
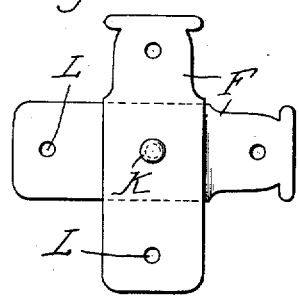
Fig. 5 is an elevation of the piston plates during a stage in the manufacture of the piston.
Figure 6:
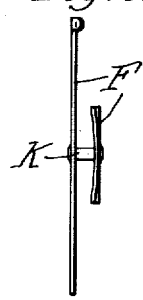
Fig. 6 is an end elevation of Fig. 5.
Figure 7:
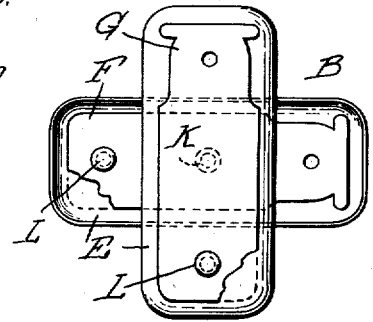
Figs. 7 and 8 are side and end elevations of the piston at another stage in the manufacture of the piston.
Figure 8:
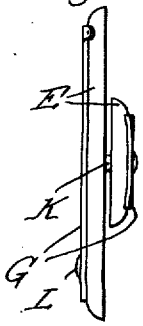

Figs. 5 and 6 show the inner plates of the piston at one of the stages during the course of manufacture of the piston. In this improved construction, the inner plates are preferably secured in spaced relation by a rivet or other fastening means K. They may then be positioned, as shown in Figs. 5 and 6, transversely or crosswise of one another with the ends of one plate out of alinement with the ends of the other plate, which permits the ready attachment of the piston leathers and the outer plates thereto. The piston leathers and the outer plates may be secured by a rivet or other fastening means through the apertures L shown adjacent the ends of the inner piston plates, as illustrated in Figs. 7 and 8. The plates may then be swung to coincide with one another and the shaft inserted and the piston riveted or otherwise secured to the shaft as at M in the positions shown in Figs. 1 and 3. The rivet or other fastening means M may be inserted so as to permit the piston to swing a limited distance on the axis of the rivet or fastening means, thus permitting the piston to conform to the piston chamber, and as best shown in Fig. 9, the shaft may be provided with a pair of inner shoulders N, which limit such swinging movement by providing stops for engaging edges of inner plates F.

We claim as our invention:

1. A fluid pressure motor having a piston and a piston shaft projecting thereform, said piston having pressure-receiving portions along said shaft at opposite sides thereof, bearings for said shaft, and an opening in said piston at said shaft, whereby air passing along said piston shaft through said bearing enters behind the pressure-receiving portions of said piston.

2. In a fluid pressure motor having a piston chamber and a piston with a piston shaft projecting thereform, said piston having pressure-receiving portions along said shaft at opposite sides thereof, and said motor having bearings for said shaft, of packing portions projecting at the sides of said piston for engaging the walls of said piston chamber, and an opening in said packing portions at said shaft, whereby atmospheric pressure is applied along said shaft and into said piston behind the pressure-receiving portions thereof.

3. In a fluid pressure motor having a piston chamber and a piston with a shaft projecting thereform, said piston having a pair of pressure-receiving portions along said shaft at opposite sides thereof, said motor having bearings for said shaft, of packing portions on the opposite pressure-receiving portions of said piston and projecting at the sides of said piston for engaging the walls of said piston chamber, and an opening in said packing portions at said shaft, whereby atmospheric pressure is applied along said shaft and into said motor behind said piston packing.

4. In a fluid pressure motor having a piston chamber and a piston with a shaft projecting therefrom, said piston having a pair of pressure-receiving portions along said shaft at opposite sides thereof, said motor having bearings for said shaft, of packing portions on the opposite pressure-receiving portions of said piston and projecting at the sides of said piston for engaging the walls of said piston chamber, the edges of said packing portions extending inwardly toward one another at the sides of said piston toward said shaft, said packing portion edges being spaced apart adjacent said shaft, whereby air admitted along said shaft enters said piston behind said packing.

5. In a fluid pressure motor having a piston chamber and a piston with a shaft projecting therefrom, said piston having a pair of pressure-receiving portions along said shaft at opposite sides thereof, said motor having bearings for said shaft, of flexible packing portions on the opposite pressure-receiving portions of said piston, the side edges of said packing portions having normal flexures outwardly toward the piston chamber walls and inwardly toward one another to seal said piston, said packing portion edges contacting with a portion of said shaft and providing an opening to the interior of said piston along portions of said shaft, whereby air admitted along said shaft may enter said piston behind said packings.

6. In a fluid pressure motor having a piston chamber and a piston with a shaft projecting therefrom, said piston having a pair of pressure-receiving parts along said shaft at opposite sides thereof, said motor having bearings for said shaft, said shaft having reduced bearing portions extending from said piston, said bearing portions providing shoulders within said piston, and flexible packing parts on said pressure-receiving parts, said flexible packing parts being braced and held outwardly adjacent said shaft by said shoulders.

7. In a piston for fluid pressure motors, the combination of a pair of plates, a piston shaft between said plates, flexible packing parts projecting from the sides of said plates, shoulders on said shaft between said plates and engaging said flexible packing parts, said shaft having reduced bearing portions extending from within said piston to a distance outside of said piston.

8. In a piston for fluid pressure motors, the combination of a pair of spaced plates, a piston shaft secured between said plates, flexible packing parts projecting from the sides of said plates, said shaft having reduced bearing portions extending from within said piston a distance outside of said piston, and means securing said flexible packing parts to said plates.

9. A piston comprising spaced plates pivotally connected so as to move relatively to one another, packing parts connected to said plates, a shaft, and means for connecting said plates to said shaft and for preventing relative movement of said plates, one to the other while connected to said shaft.

10. In a piston, the combination of a pair of substantially duplicate spaced plates adapted to be attached to a shaft in coincident parallel relation, a pivotal connection between the ends of said plates whereby said plates may be turned to extend transversely of one another, whereby the ends of one of said plates are out of alinement with the ends of the other of said plates, and whereby piston packing members may be secured thereto without interference by the other plate.

11. In a motor having a piston chamber, a piston shaft, a piston plate, a flexible packing member for said piston plate, a pair of shoulders on said shaft behind and engaging said flexible packing member for holding portions of said packing member outwardly, a pivotal connection between said plate and shaft, and parts on said shaft providing stops for limiting pivotal movement of said plate with respect to said shaft.

12. In a motor, a piston having a pair of inner plates spaced one from the other, a pair of outer plates, flexible packing members interposed between said inner plates and said outer plates, means for connecting said plates and packing members together with portions of said packing members projecting beyond said plates, a piston shaft having a portion extending between said inner plates, and means for pivotally securing said plates and packing members to said piston shaft.

13. In a motor, a piston comprising a pair of plates, flexible packing members secured to said plates and having portions projecting beyond said plates to contact with the walls of a piston chamber, a piston rock shaft having a portion positioned between said plates, whereby said portion is surrounded by said plates and said piston extends above and below said shaft, and means pivotally connecting said piston to said shaft.

14. In a motor, a piston comprising a pair of plates, flexible packing members secured to said plates and having portions projecting beyond said plates and extending inwardly toward one another to contact with the walls of a piston chamber, a piston rock shaft having a portion positioned between said plates whereby said portion is surrounded by said piston and said piston extends above and below said shaft, and means pivotally connecting said piston to said shaft.

15. A fluid pressure motor having a casing provided with a sector-shaped piston chamber, a vane piston having a shaft whereby it is pivoted to swing in said chamber, cupped packings fixed on opposite sides of said piston and having flexible edges directed towards one another to contact with the interior of the piston chamber, said casing having an opening through which atmospheric pressure may act between said packings to force the edges of said packings against the interior of said chamber.

JOHN R. OISHEI.
ERWIN C. HORTON.

ing provided with a sector-shaped piston chamber, a vane piston having a shaft whereby it is pivoted to swing in said chamber, cupped packings fixed on opposite sides of said piston and having flexible edges directed towards one another to contact with the interior of the piston chamber, said casing having an opening through which atmospheric pressure may act between said packings to force the edges of said packings against the interior of said chamber.

JOHN R. OISHEI.
ERWIN C. HORTON.

Certificate of Correction.

It is hereby certified that in Letters Patent No. 1,565,493, granted December 15, 1925, upon the application of John R. Oishei, of Buffalo, and Erwin C. Horton, of Hamburg, New York, for an improvement in "Fluid-Pressure Motors," an error appears in the printed specification requiring correction as follows: Page 1, line 66, after the word "piston" insert the words *of the type described and claimed in the pending application of John R. Oishei, Serial No. 617,873, filed February 7, 1923;* and that the said Letters Patent should be read with this correction therein that the same may conform to the record of the case in the Patent Office.

Signed and sealed this 26th day of January, A. D. 1926.

[SEAL.]

WM. A. KINNAN,
*Acting Commissioner of Patents.*

Certificate of Correction.

It is hereby certified that in Letters Patent No. 1,565,493, granted December 15, 1925, upon the application of John R. Oishei, of Buffalo, and Erwin C. Horton, of Hamburg, New York, for an improvement in "Fluid-Pressure Motors," an error appears in the printed specification requiring correction as follows: Page 1, line 66, after the word " piston " insert the words *of the type described and claimed in the pending application of John R. Oishei, Serial No. 617,873, filed February 7, 1923;* and that the said Letters Patent should be read with this correction therein that the same may conform to the record of the case in the Patent Office.

Signed and sealed this 26th day of January, A. D. 1926.

[SEAL.]
                WM. A. KINNAN,
                 *Acting Commissioner of Patents.*